Sept. 30, 1969   H. A. RAUSING ET AL   3,469,760
LIQUID PACKAGE FOR FILLING MATERIAL UNDER PRESSURE
Filed March 29, 1968   3 Sheets-Sheet 1

Sept. 30, 1969      H. A. RAUSING ET AL      3,469,760
LIQUID PACKAGE FOR FILLING MATERIAL UNDER PRESSURE
Filed March 29, 1968                     3 Sheets-Sheet 2

United States Patent Office 3,469,760
Patented Sept. 30, 1969

3,469,760
LIQUID PACKAGE FOR FILLING MATERIAL UNDER PRESSURE
Hans Anders Rausing and Gad Anders Rausing, Lund, Sweden, assignors to Sobrefina SA, Fribourg, Switzerland, a Swiss company
Filed Mar. 29, 1968, Ser. No. 717,226
Claims priority, application Sweden, Apr. 6, 1967, 4,796/67
Int. Cl. B65d *5/60, 85/70;* B65b *31/02*
U.S. Cl. 229—14         7 Claims

ABSTRACT OF THE DISCLOSURE

A container for pressurized liquids is provided with a flexible, tubular, gas-impermeable hose member, sealed at both ends and a relatively non-flexible sleeve member which supports said tubular hose member. Closure members are provided at each end of the sleeve, at least one of them having an opening for exposure of the sealed end of the hose member which can be ruptured when the liquid is to be removed.

---

Figure 1:
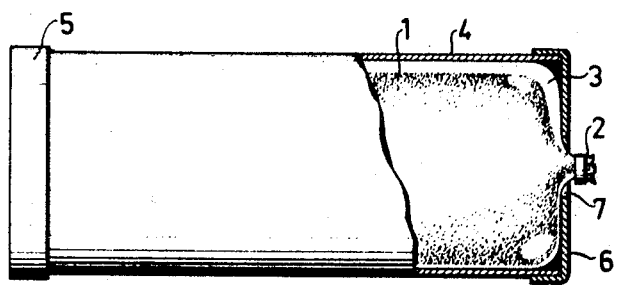

The present invention relates to a liquid package for filing material under pressure and consists of a hose of flexible plastic material. The hose is closed at both ends and the filling material is enclosed in the said hose portion limited by end closures.

Liquids such as beer, soda water and other carbonated beverages are the cause of an inner excess pressure in those packages in which they are enclosed, and certain demands must therefore be placed on these packages. Packages for this type of filling material thus have to be liquid-proof, and also impermeable to the carbon dioxide dissolved in the liquid. Moreover, the packages must be mechanically stable to such a degree that they can endure the inner excess pressure which may arise in the package. This inner excess pressure varies for different kinds of beverages between a pressure of 0.5 and 4 above atmospheric, which might cause considerable stresses on the package material.

It is known to pack filling material of the kind mentioned above in packages made of glass and sheet metal, but these packages have certain inconveniencies. These are, on one hand, that the packages are comparatively expensive and, on the other hand, that they are comparatively heavy, which affects the costs of transportation and, moreover, they are comparatively difficult to destroy.

The package according to the invention described in the following embodiment is based on materials like cardboard and plastic, that is to say inexpensive and light materials which may also be easily destroyed by burning. It is, of course, known per se to use cardboard and plastic for packages, but these packages have not been suitable for the filling materials previously mentioned, and the reason for this is of course that the known packages among other things do not fulfill the mechanical demands placed on a package for filling materials under pressure. The liquid package according to the invention, which is constructed in particular for filling materials under pressure, consists of a hose of flexible plastic material, which hose is closed at both ends; the filling material is enclosed in the said portion of the hose limited by end closures.

The characteristic features of the package according to the invention is that the hose is surrounded by a tubular sleeve of a comparatively stiff and not very flexible material, which sleeve is adapted to take up the stresses caused by the filling material, which would otherwise result in a deformation of the hose. In addition, the invention relates to the method of producing the said liquid package, which is characterized in that the filling, the closing, and the mounting of the sleeve take place in a chamber in which the pressure is adapted to the pressure of the filling material in such a way that the pressure inside and outside the filled hose portions is substantially the same.

Another possibility is of course to make the filling at such a temperature that the filling material will not produce any excess pressure in the hose.

Figure 1A:
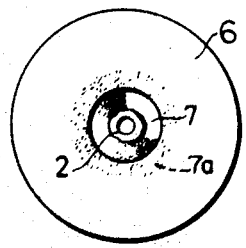
Figure 2:
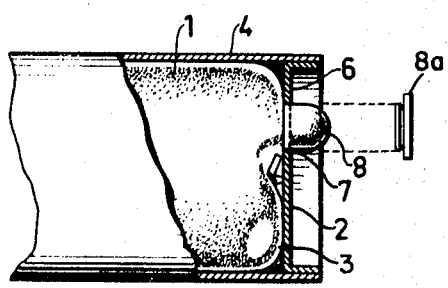
Figure 2A:
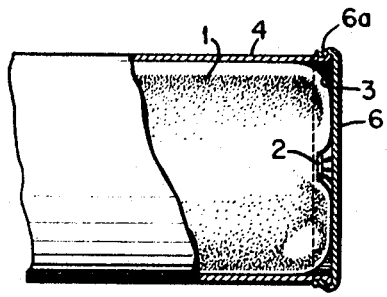
Figure 3:
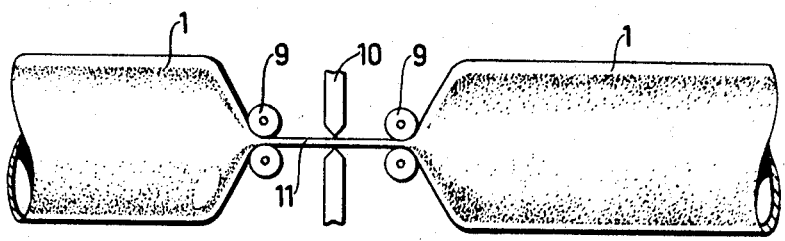
Figure 4:
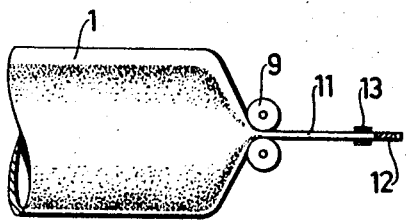
Figure 4A:
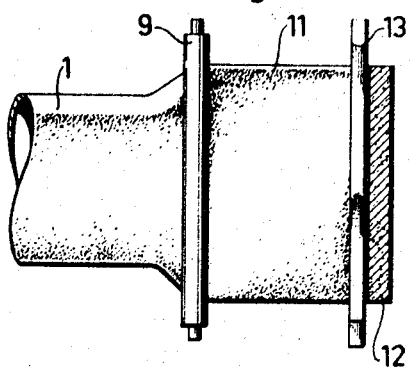
Figure 5:
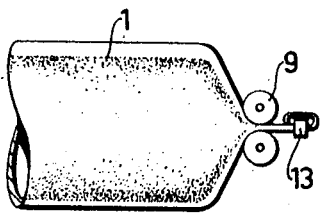
Figure 5A:
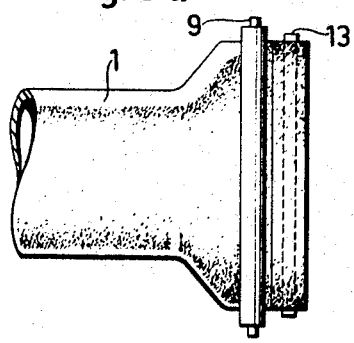
Figure 6:
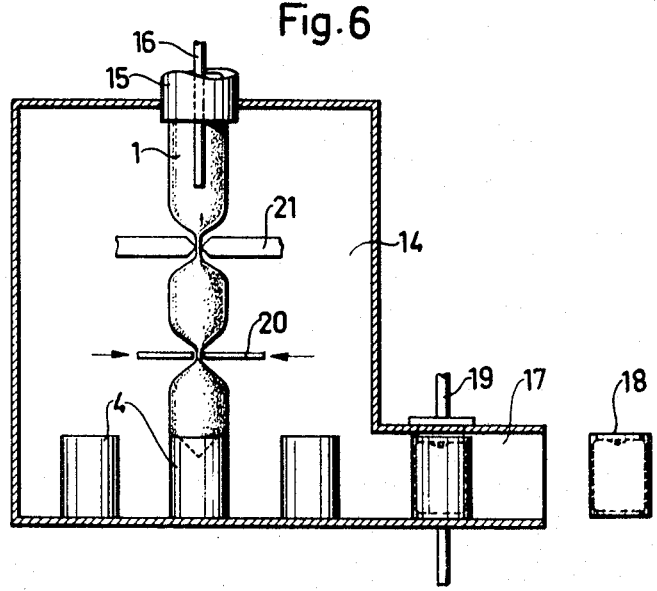
Figure 7:
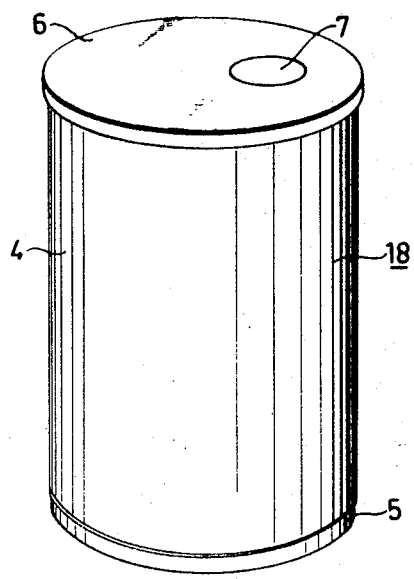

The invention will now be described with reference to the accompanying diagrammatic drawings, in which:

FIGS. 1 and 1a are a side view, partially in cross-section and an end view respectively of a container according to the invention, FIG. 2 shows a partial side view, partly in cross-section of another form of the invention, FIG. 2a is a partial side view, partly in cross-section of still another form of the invention, FIG. 3 shows in elevation means for sealing the hose, FIGS. 4 and 4a show, in elevation and in a plan view respectively the application of a sealing clip to the sealed end of the hose, FIGS. 5 and 5a show, in elevation and in a plan view, respectively the final disposition of the sealing clip, FIG. 6 illustrates an arrangement of equipment for forming a container according to the invention, FIG. 7, finally, shows a perspective view of the finished package.

The package shown in FIGS. 1 and 1a consists of a hose portion 1 filled with filling material under pressure, which has been closed at its end portion 3 by means of seals 2. The filled and closed hose portion 1, which consists of a comparatively thin and flexible plastic foil, is surrounded by an outer sleeve 4 of for instance cardboard or a similar stiff or not very flexible material. The sleeve 4 is closed at both ends by means of end washers or closures 5 and 6, which can be glued or squeezed onto the sleeve 4. The end washer 6 has an opening 7. The inside of the end washer 6 is provided with an adhesive coating 7a, at least in the area around the opening 7, which means that the end portion 3 of the hose portion 1 is pressed against the end washer 6 at the mounting thereof and adheres to the end washer in the area around the opening 7 at the same time as the wall of the hose is stretched flat across the opening 7. The outer sleeve 4 may preferably be made of a wound cardboard or paper tube of cylindrical shape, and it may of course be provided on its outer side with advertising material or an instructive text.

The opening of the package is carried out in such a way that the wall of the hose stretched flat across the opening 7 is punctured by some sharp object, whereupon the filling material may be emptied through the opened wall and the opening 7.

If the outer sleeve 4 should not quite enclose the tube portion 1, this would be deformed, as it is flexible, and would endeavour to assume the form of a sphere. Through its stretching the material is weakened, and therefore there is a considerable risk that the package material will break. The end portions 3 are not supported by the sleeve 4, and therefore they will endeavour to assume a domed shape. However, the domed shape is much more favourable, from the viewpoint of strength, than the cylindrical shape (the tensile stresses in a spherical shell are only half as great as the corresponding tensile stresses in a cylinder). Owing to the fact that the outer sleeve is not flexible, while the hose is flexible, the hose will lie closely along an essential portion of its area against the outer sleeve 4, which prevents further deformation of the hose 1 and absorbs most of the stresses occurring in the cylindrical portion of the hose. The end washers 5 and 6 will of course also support the end portions 3 of the hose 1, thereby unloading the stresses on the hose material in these portions. The end washers 5 and 6 may either be made of the same material as the sleeve 4, or they may be made of sheet metal or plastic end pieces, and to make sure of a solid fastening in the sleeve 4 around the end pieces 5 and 6 they may be squeezed onto the sleeve as shown at 6a in FIG. 2a.

In FIG. 2 there is a package which in all essentials agrees with the package shown in FIG. 1. The thickness and the flexibility of the plastic material and the dimension of the opening 7 have, however, been chosen in relation to each other and to the inner pressure prevailing in the hose 1, in such a way that the wall of the hose will project with a portion 8 through the opening 7 so as to form a spout which is cut off when opening of the package. By sealing the opening with a plug 8a it is possible to prevent the wall of the hose from projecting through the opening before the plug has been removed.

For the production of the package it is most suitable to start with a seamless hose, which is either prefabricated or extruded through an annular extruding orifice.

FIG. 6 shows an extruding orifice 15, in the central portion of which there is arranged a filling pipe 16. The extruding orifice 15 is mounted in the wall of a pressure chamber 14 in which a pressure is maintained which corresponds to the pressure in the finished filled hose portions. The extruded hose 1 is filled with filling material through the filling pipe 16, whereupon the hose is divided into package units by sealing means 21 through successive transverse seals, which units are inserted into prefabricated sleeves 4. The filled and closed hose portions are separated from the rest of the hose by the separating means 20 and are withdrawn from the pressure chamber via a pressure lock 17, the pressure difference arising between the interior of the package and the surrounding atmosphere at the withdrawal of the completed packages 18 from the pressure chamber 14 causing the hose portion 1 arranged in the sleeve 4 to be pressed against the sleeve, which absorbs stresses occurring in that connection. The end pieces 5 and 6 of the package may be mounted already in the pressure chamber by means of the device 19 diagrammatically shown for mounting the end pieces, but they might as well be applied after the hose portion 1 and its surrounding sleeve 4 has been withdrawn from the pressure chamber 14.

In addition to the method described above, it is of course possible, and in certain cases suitable, to form the hose 1 from a plane web which is folded into a tube and has its longitudinal joint sealed in a known way.

Moreover, it may in certain cases be suitable to exclude the described pressure chamber 14 and instead of this, carry out the filling of the filling material at such a low temperature that the gas discharge therefrom is exceedingly small, whereby none or at least very little excess pressure will form in the hose.

In those cases when the supporting and pressure receiving function of the end pieces is made use of, it may be suitable to make the end pieces of sheet metal or other permanently deformable material and to squeeze the end pieces onto the ends of the sleeve 4 as shown in FIG. 2a. One of the end pieces may be provided with a removable cap device so that the wall of the hose may be broken and the filling material made accessible.

At the production of the proposed package there were certain difficulties in producing a tight and durable end joint of the hose portions 1. Ordinary heat-sealing or welding of the hose material across the longitudinal axis of the hose proved to yield a tight joint, while the strength appeared to be comparatively bad, and the joint was easily split open when the pressure in the hose increased. However, an end closure with a metal clip fulfills the demands of strength, but on the other hand the imperviousness to gas of such a closure is bad.

In FIGS. 3, 4, 4a, 5 and 5a there is shown a method of separating and sealing the hose in such a way that the demands of strength as well as imperviousness are fulfilled.

FIG. 3 shows how squeezing rollers 9 remove the filling material from a zone 11 and how the central portion of said zone is then welded together by means 10 for applying heat and pressure. If desirable, the welding may of course be done by means of high-frequency welding, if the package material is suitable for this kind of welding method. After the welding, the tube is separated through a cut in the welded zone 12, as shown in FIGS. 4 and 4a whereupon metal clips 13 are applied onto the outer part of the uncovered zone 11, which is then rolled up on said metal clips, and pressed inwardly and together after the rolling-up in such a way that the parts 11, rolled up on the metal clips 13, are fixed in the rolled-up position as shown in FIGS. 5 and 5a.

FIG. 7 is a view of the finished package 18, which comprises a cylindrical sleeve 4, two end piece portions 5 and 6, and a hose portion enclosed in said sleeve and between the end pieces and containing the filling material.

The above description of the package and the method of producing it may of course be modified within the scope of the inventive idea. Consequently, the outer sleeve does not necessarily have to be made of cardboard, but may of course be made to advantage of sheet metal, Bakelite, or another suitable material. Moreover, the plastic hose 1 may consist of a laminate or may be provided with a coating of a material impervious to carbon dioxide, e.g. Saran. The plastic material in the hose 1 has not been defined in detail but may preferably consist of polyvinyl chloride or of polyethylene or any other polyolefin coated with a material impervious to carbonic acid or laminated with such a material.

We claim:

1. A container for liquids under pressure comprising a flexible tubular gas-impermeable hose member for said liquids, said tubular hose being sealed at both ends, a sleeve member of relatively non-flexible material closely surrounding said tubular hose member for supporting said hose member, closure members secured to each end of said sleeve member in abutting relation with the sealed ends of said tubular hose member, at least one of said closure members being provided with an opening therein, whereby the portion of the tubular hose member adjacent said opening may be ruptured when desired to remove the liquids from said container.

2. A container as claimed in claim 1 and further comprising adhesive means surrounding the opening on the inside of said closure means for securing the sealed end of said tubular hose member to said closure means.

3. A container as claimed in claim 1 wherein the size of said opening is such that the filled tubular hose member will not protrude therethrough.

4. A container as claimed in claim 1 wherein the size of the opening is such that the filled tubular hose member will not be ruptured by the pressure within said container.

5. A container as claimed in claim 1 and further comprising a removable cover member for closing said opening until it is desired to rupture said tubular hose member for removing the liquids from the container.

6. A method of producing a composite container having a sleeve for liquids under pressure comprising filling a flexible, tubular gas-impermeable hose member with a liquid, sealing the ends of said filled tubular hose member to form a sealed container, enclosing the container with a relatively non-flexible sleeve member and applying closure memoers to the ends of said sleeve member in abutting restraining relation to the sealed ends of said container, at least one of said closure members being provided with an opening therein to permit rupture of said container when desired to subsequently remove the liquids from said container.

7. A method as claimed in claim 6 wherein the tubular member is filled with a liquid containing a dissolved gas and the filling and the sealing of said tubular member are carried out under conditions by which the pressure inside and outside said tubular member are substantially the same.

References Cited
UNITED STATES PATENTS

| | | |
|---|---|---|
| 2,214,944 | 9/1940 | Vogt. |
| 2,368,624 | 2/1945 | Walton. |
| 2,748,673 | 6/1956 | Winstead. |
| 2,946,494 | 7/1960 | Kuss. |

DAVID M. BOCKENEK, Primary Examiner

U.S. Cl. X.R.

53—22; 206—46